United States Patent
Zelener et al.

(10) Patent No.: US 12,311,969 B1
(45) Date of Patent: May 27, 2025

(54) PROCESSING SENSOR DATA

(71) Applicant: Zoox, Inc., Foster City, CA (US)

(72) Inventors: Allan Zelener, San Mateo, CA (US); Qiang Zhai, Foster City, CA (US)

(73) Assignee: Zoox, Inc., Foster City, CA (US)

(*) Notice: Subject to any disclaimer, the term of this patent is extended or adjusted under 35 U.S.C. 154(b) by 207 days.

(21) Appl. No.: 18/087,145

(22) Filed: Dec. 22, 2022

(51) Int. Cl.
*B60W 60/00* (2020.01)
*G01S 7/481* (2006.01)
*G01S 17/931* (2020.01)

(52) U.S. Cl.
CPC ......... *B60W 60/001* (2020.02); *G01S 7/4817* (2013.01); *G01S 17/931* (2020.01); *B60W 2420/408* (2024.01)

(58) Field of Classification Search
CPC ........... B60W 60/001; B60W 2420/408; G01S 7/4817; G01S 17/931
See application file for complete search history.

(56) References Cited

U.S. PATENT DOCUMENTS 11,099,561 B1 * 8/2021 Kentley-Klay ..... B60W 50/082

* cited by examiner

*Primary Examiner* — Yuen Wong
(74) *Attorney, Agent, or Firm* — EIP US LLP

(57) ABSTRACT

A method is provided comprising performing a first sweeping scan using a sensor (e.g. a lidar sensor) of a vehicle when the vehicle is navigating in a first direction. The first sweeping scan comprises a seam at a first location relative to the vehicle. A second sweeping scan is defined when the vehicle is navigating in a second direction. The second sweeping scan comprises a seam at a different second location relative to the vehicle. The vehicle is controlled based at least in part on the first sweeping scan.

16 Claims, 5 Drawing Sheets

PROCESSING SENSOR DATA

BACKGROUND

A vehicle can use a number of different types of sensors to detect properties of the environment in which it is travelling. Autonomous vehicles in particular may use sensor measurements to make decisions about how to operate the vehicle. One type of sensor is a light detection and ranging, or "lidar", sensor. A lidar sensor can measure distances to visible surfaces by emitting light and measuring properties of the light. In some cases, a lidar sensor may rotate to provide a wider field of view than would be obtained with a fixed sensor.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
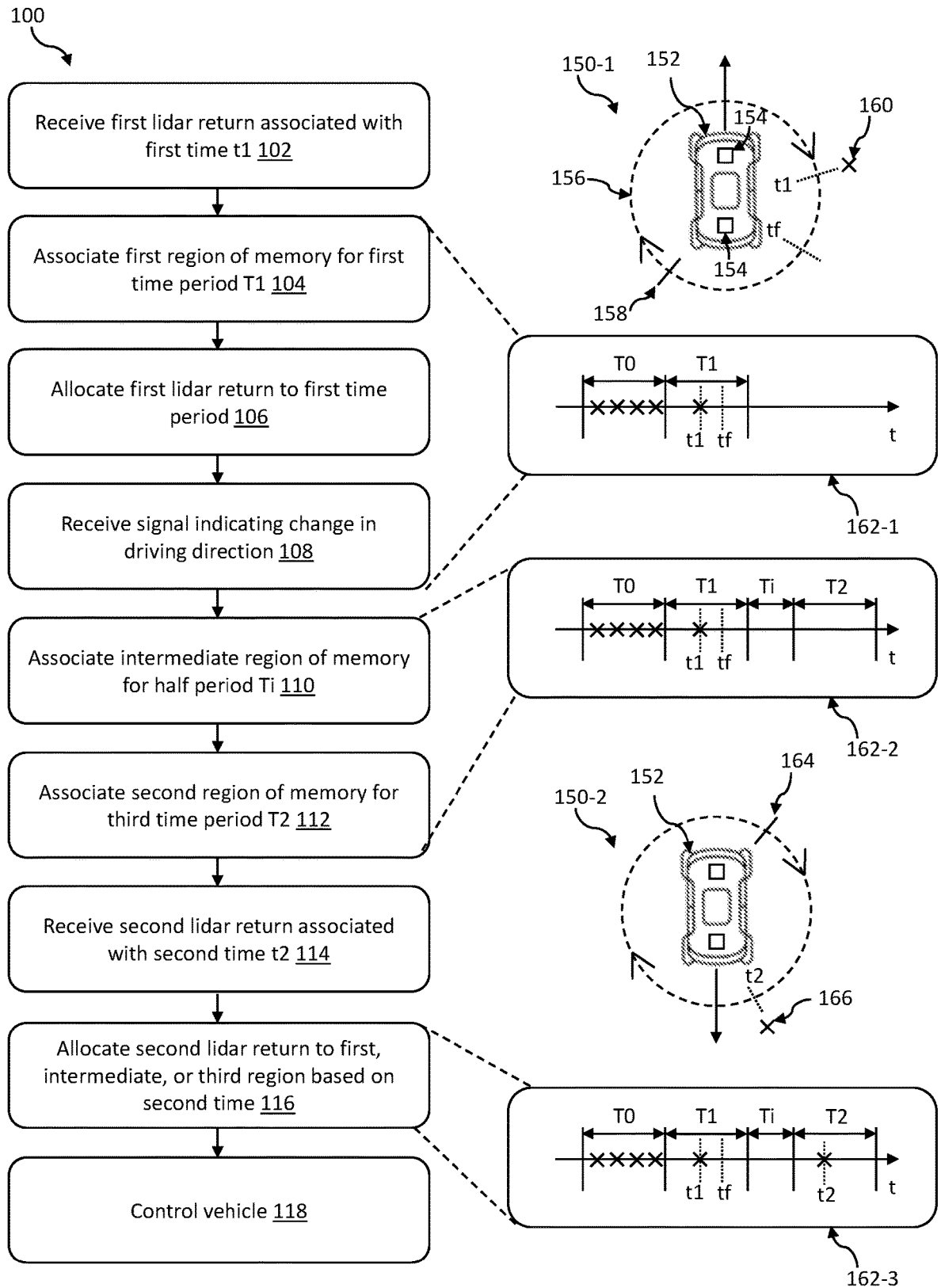
FIG. 1 is illustrates a method for allocating lidar points when a driving direction of a vehicle changes.

As mentioned above, vehicles, such as autonomous vehicles, can include a number of sensors configured to generate sensor data about an environment. Such sensor data may be received from the sensors at the vehicle control system and used to perceive the environment. Based on these perceptions, the vehicle control system can generate controls to navigate in the environment. One type of sensor data that a system, such as a vehicle control system, can use to interpret an environment is lidar data. For example, an autonomous vehicle can include one or more lidar sensors. Each sensor may be configured to generate lidar measurements within a field of view around the vehicle. For example each sensor may generate measurements around a 360-degree field of view. Each sensor may generate measurements within a field of view that is more or less than 360-degrees. For example, a single scan of a sensor may extend 5-degrees or 10-degrees beyond 360-degrees, to provide overlap with subsequent scans. A scanning lidar sensor may rotate, e.g., about a (substantially) vertically-oriented axis, to scan the full 360-degrees about the sensor. The substantially vertically-orientated axis may deviate from a perfectly vertical axis, with respect to the vehicle. For example the axis may deviate from true vertical up to 10-degrees. or up to 15-degrees. Alternatively or additionally, a system of lidar sensors may together provide a 360-degree view, for example by each covering a portion of the total field of view. In examples, the sensors may provide more or less than a 360-degree field of view. It may be advantageous for the system to cover more than a 360-degree field of view to account for changes in position of the vehicle between the beginning and ending of a metaspin (e.g., if the vehicle is turning during a sensor sweep). Lidar returns associated with a single scan, e.g., returns for a complete rotation around the axis, may comprise a series of lidar points each taken at a different time instant as the sensor rotates. Thus a single lidar scan may not represent the same instant in time. Instead, returns associated with a single scan are varied in time by as much as the time it takes for the sensor to complete the rotation. Lidar points associated with a single sensor rotation may be grouped into a data bin representing a single rotation of the sensor. Such a data bin may be referred to as "metaspin". A lidar point may be allocated to a metaspin based on a timestamp associated with the lidar point (e.g. the time the reflection was received), or based on an azimuthal position associated with the lidar point (e.g. azimuthal angle of the sensor when the lidar point was received, with respect to a defined zero azimuthal angle). A metaspin may be processed and/or provided to downstream vehicle systems. For example, a metaspin may be processed by a perception component to generate representations of objects (e.g. bounding boxes, points, or contours). A metaspin, or data derived from a metaspin, may be provided to downstream systems such as prediction and planning components of an autonomous vehicle to provide data representing the environment around the vehicle to assist with controlling the vehicle.

A metaspin may be defined by a start and end point, for example a start and end time or start and end azimuthal angle of the sensor. Due to the time taken for a single lidar rotation to complete, a lidar point received at the start of a metaspin and a lidar point received at the end of the metaspin may be separated in time by the rotation time of the sensor, even though the points may represent the same position in space with respect to the vehicle. For example, a scan of the sensor may take approximately 100 ms. Thus the time associated with a lidar point received at the start of a metaspin may be 100 ms different from the time associated with a lidar point received at the end of a metaspin. The environment may have changed in that time, causing differences between the lidar points received at the start and end of the spin. A metaspin may therefore comprise a temporal seam, where two points separated in time are presented at approximately the same position relative to the vehicle in a single metaspin. The lidar data around the temporal seam may comprise distortions due to the time difference. Such distortions may reduce the reliability of perception, predictions, etc. relating to the portion of the environment captured in the temporal seam, and/or of any control decisions made relating to the lidar data in the temporal seam. Accordingly, the position of the temporal seam may be determined to minimize any impact on prediction and/or planning functions of the vehicle. In general, this may be achieved by defining the temporal seam such that it is behind the vehicle's current direction of travel. Data about the environment in front of the vehicle may be most important for deciding how to move the vehicle, so positioning the temporal seam of a metaspin behind the vehicle may limit the impact of the temporal seam. However, a vehicle may change direction. In particular, a vehicle may be a bi-directional vehicle configured to operate in two driving directions (e.g. opposing driving directions). A change in direction may change the position of the temporal seam with respect to the moving/driving direction of the vehicle. For example, where a bi-directional vehicle switches from a first driving direction to an opposing driving direction, the rear of the vehicle may become the front of the vehicle, with respect to the direction of travel of the vehicle. Thus a temporal seam at the rear of the vehicle may be positioned, after the switch in driving direction, at the new front of the vehicle. This may be undesirable for the reasons discussed above.

Techniques of the present disclosure provide for the position of the temporal seam of a lidar metaspin to be changed when a vehicle changes moving/driving direction. Techniques may, upon receipt of a signal indicating a change in moving direction, define a transitional metaspin that moves the temporal seam. The transitional metaspin may be defined at the end of a current 'normal' metaspin (i.e. a start time/azimuthal position of the transition metaspin corresponds to an end time/azimuthal position of the current metaspin). The transitional metaspin may be defined after all active metaspins. An active metaspin may be a metaspin that has to which at least one lidar point has already been assigned. A new normal metaspin may be defined after the end of the transitional metaspin. The transitional metaspin may have a duration that is less than the duration of the normal metaspins. In this way the position of the start/end seam may be moved. In some examples, the traditional metaspin may have a duration half, or approximately half, that the normal metaspins. Such examples may move the temporal seam from one end of the vehicle to the other end of the vehicle, for example moving the temporal seam to the new rear of a bidirectional vehicle after a switch in driving direction. Thus techniques of the present invention may delay the time at which the temporal seam is moved after receiving a signal indicating a switch in driving/moving direction. Such techniques may allow active metaspins that have already been defined to continue to receive lidar data, rather than having to redefine active metaspins. Such techniques may use buffer memory holding active metaspins more efficiently, by avoiding redefinition of buffer regions for metaspins that already have received a lidar point. Such techniques may minimize disruption to downstream processes that receive completed metaspins, such as a prediction or planner component, by avoiding delay, maintaining continuity of 'normal' metaspin size, and/or minimizing the number of lidar points that are not allocated to 'normal' metaspins due to the switch in driving/moving direction. Techniques of the present disclosure may thus allow lidar data to be used to provide reliable control of an autonomous vehicle, even when a switch in driving/moving direction occurs.

In some examples, a first data point captured by a sensor of a vehicle is received. The sensor may be or comprise a lidar sensor, multiple lidar sensors, or any other sensor (e.g. a radar sensor, camera, etc.). The first data point may be associated with a first sensor position. As used herein, sensor position may be defined by a time, for example a time at which the data point was captured. A data point may be associated with a timestamp, indicating the time at which the sensor point was captured. Sensor position may be defined by an orientation of the sensor, for example an orientation or azimuthal angle of the sensor, for example when the data point was received. Techniques may comprise associating the first data point with a first data bin based on the first sensor position. The first data bin may represent a first range of sensor position. For example a data bin may be a metaspin, representing one complete scan of the lidar sensor (e.g. a 360-degree spin). Techniques may receive a signal indicating a change in a moving or driving direction of the vehicle. As used herein a driving direction may represent a mode of operation of the vehicle, for example such that a change in driving direction may result in a change of the 'forwards' direction of travel of the vehicle. A moving direction may represent any change in direction of the vehicle, including a change from forwards movement to reverse movement. In response to the signal indicating a change in the moving direction, techniques may define a second data bin. The second data bin may be a transitional metaspin. The second bin may represent a second range of sensor positions. The second range may be after the first range of sensor positions. The second range may have a different length to the first range of sensor positions (e.g. a different duration, or represent a different angular range around the vehicle). For example the second range may be smaller, or larger, than the first range. Techniques may receive a second data point associated with a second sensor position. Techniques may associate the second data point with the first data bin or the second data bin based on the second sensor position. Techniques may control the vehicle based at least in part on data points allocated to the first data bin.

In some examples, the signal indicating the change in driving direction is associated with the first range of sensor positions. For example, the signal may indicate that the switch occurred at a time corresponding to the first range of sensor positions; or the signal may be received during the sensor scan corresponding to the first range or sensor positions. The second range of the second data bin may follow immediately after the first range of the first data bin. Such examples allow the already defined 'current' metaspin to receive all lidar points associated with it. The transitional metaspin may be defined to follow immediately after the current metaspin. Lidar points associated with the transitional metaspin (e.g. having a timestamp corresponding to the time range of the second/transitional data bin) may be allocated to the transitional metaspin when received. It is to be noted that lidar points may be received, e.g. at buffer memory, sometime after the sensor itself generates the lidar point. Lidar points may even be received out of order, especially where the sensor actually comprises multiple different lidar sensors. Techniques of the present disclosure allow for the 'current' metaspin to be retained, so that it can continue to receive lidar points associated with the first range of sensor positions, without having to reallocate already received lidar points.

In some examples, the signal indicating the change in direction may be associated with an earlier range of sensor positions/earlier time than the first range of sensor positions. The signal may be referred to herein as a "flipping signal". Thus, there may be further complete original metaspins, e.g. in buffer memory, after the time associated with the flipping signal, but before the transitional metaspin is inserted to change the position of the temporal seam. In examples, any already defined metaspin/data bin/buffer region which has been allocated at least one lidar point (i.e. an 'active metaspin') may be retained, with the transitional metaspin defined only after the last active metaspin. As above, such examples may avoid having to reallocate already stored lidar points upon receipt of the flipping signal. Such examples may be particularly useful where the flipping signal is not immediately processed (e.g. by a perception component of the vehicle) upon receipt of the flipping signal.

In some examples, the vehicle may undergo multiple changes of direction within a short time. In particular, multiple flipping signals may be received before a new metaspin, positioned after the transitional metaspin, becomes active. Accordingly, some examples may define one or more further transitional metaspin. A further transitional metaspin may have the same or a different length to the original transitional metaspin. In some examples, the further transitional metaspin(s) may be defined immediately after the original transitional metaspin. In such cases, multiple transitional metaspins may be 'collapsed', combining the transitional metaspins together. In particular, multiple metaspins may be combined to define a 'normal' metaspin, i.e. a metaspin with the same or similar length to the first metaspin/data bin. This 'normal' metaspin may in some examples restore the temporal seam to its original position. The 'normal' metaspin may be allocated data points as normal, and may be published as a normal metaspin. Thus when transitional metaspins are 'collapsed', it may not be apparent to downstream processes that a transitional metaspin had been defined at all.

Accordingly, techniques (including, but not limited to, a method, a system, and one or more non-transitory computer-readable media) may be provided as discussed herein.

FIG. 1 illustrates a method 100 according to techniques of the present disclosure. Method 100 may be performed by a system or component of a vehicle, such as an autonomous vehicle. In particular method 100 may be performed by a perception component of a vehicle, such as the perception component discussed below in relation to FIG. 5. Method 100 may in particular be performed by an onboard system of a bi-directional vehicle. A bi-directional vehicle may be a vehicle configured to operate in a first driving direction or an opposing second driving direction. A bi-directional vehicle may be configured to operate in two different driving modes, one associated with first driving direction and the other associated with the second driving direction. As used herein, a bidirectional vehicle may be one that is configured to switch between traveling in a first direction of the vehicle and a second, opposite, direction of the vehicle. In other words, there is no fixed "front" or "rear" of the vehicle. Rather, whichever longitudinal end of the vehicle is leading at the time may become the "front" and the trailing longitudinal end may become the "rear." For example, the vehicle may comprise respective sets of rear lights (e.g. reversing, braking lights) on both longitudinal ends. When the driving direction is switched, the set of rear lights on the new trailing longitudinal end may be switched to active (such that they may engage/illuminate, e.g. if the vehicle brakes or reverse). The other set of rear lights, on the now leading longitudinal end, may be switched to unactive (e.g. such that they do not engage/illuminate if the vehicle brakes or reverses).

Method 100 may comprise operation 102, which may comprise receiving lidar data of an environment captured by a lidar sensor of an autonomous vehicle, the lidar data comprising a first lidar return (e.g. a first lidar point) associated with a first timestamp. It is to be noted that as used herein, any example of a lidar/data point may instead be a lidar/data return, for example where lidar data is not stored as a point. Example 150-1 illustrates a vehicle 152 comprising two lidar sensors 154. Each lidar sensor may rotate with respect to a vertical axis of the vehicle. Each sensor 154 may rotate a full 360-degrees. Although comprising two separate sensors, such an arrangement may be referred to herein as a "lidar sensor". In other words, a lidar sensor according to the present disclosure may comprise multiple individual lidar sensors. Lidar points from the sensor(s) 154 may be grouped into metaspins as discussed above. Each metaspin may represent one complete scan around the vehicle 152, i.e. one full rotational detection cycle. A metaspin may be defined by its start and end position, or equivalently start and end time. The start and end of a full rotational cycle may join to form a seam. In some examples the start and end may overlap (forming a buffer period), in which case the seam is positioned at the point the start and end begin to overlap (i.e. the start/end may comprise a range of sensor positions/times). In the example 150-1 shown in FIG. 1, a single metaspin starts and ends at point 158. Point 158 thus represents a temporal seam, as discussed above. The temporal seam 158 has a first position with respect to the vehicle 152. In this example the start and end of the metaspin are co-located at point 158. It is to be noted that in other examples the start and end point of a metaspin may be at different positions. In particular, the end point may extend beyond the angular position of the start point, such that each metaspin comprises a buffer period overlapping with the next metaspin. The buffer period may account for hardware delays.

In the example 150-1, the vehicle 152 is travelling forwards indicated by the arrow. The temporal seam represented by point 158 is positioned at the rear of the vehicle. Generally an end point of a metaspin may represent an azimuthal position with respect to an initial moving direction of the vehicle in the range from 90° to 270°.

In the example 150-1, the lidar sensor(s) 154 scans in a clockwise direction around the vehicle 152. In other examples lidar sensors may scan in an anti-clockwise direction. A first lidar point 160 may be received. The first lidar point may be associated with a first timestamp, t1. The first timestamp t1 may represent the time at which the first lidar point was received by lidar sensor(s) 154, and thus may represent the angular position of the sensor(s) 154 at the time the lidar point was received. The first lidar point 160 may indicate a property of the environment at that angular position with respect to the vehicle 152.

Method 100 may comprise operation 104, at which a first region of a memory may be associated with a first full rotational detection cycle of the lidar sensor. For example, a first region may be allocated for storing lidar data points associated with a first time period. In some examples a region of the memory may be pre-allocated for storing lidar returns, and may be temporarily associated with a specific detection cycle when appropriate. Such a pre-allocated region may be re-used for multiple different detection cycles (e.g., as a buffer). The first time period may represent the first full detection cycle of the lidar sensor (optionally with an extra buffer period, as discussed above). The memory may be a buffer memory associated with the sensor(s) 154, or associated with a perception component of the vehicle. Example 162-1 illustrates allocations of regions within a memory. Two regions are illustrated in example 162-1: a first region T1 for a first time period, and an earlier region T0 for an earlier time period. Each region acts as a data bin for storing lidar points having timestamps in the respective time regions T0, T1. Equivalently, regions may be defined based on ranges of sensor positions. Each region T0, T1 represents a metaspin. In the illustrated example, the earlier region T0 has received all its expected lidar points, and so may be considered complete. The earlier region T0 may have been output to downstream systems, for use in controlling the vehicle 152. In some examples, a full 360-degree scan of the lidar sensor 154 may take approximately 100 ms. Accordingly, the first region may have a duration of approximately 100 ms.

Method 100 may comprise operation 106, at which the first lidar point 160 may be allocated the first region T1 of the memory based on its timestamp t1. In other words, t1 falls within the first time range of the first region T1, and so may be allocated to the first region T1 in the buffer memory. Example 162-1 illustrates the first lidar point 160 allocated within the first region T1. As the first region T1 has received at least one lidar point, it may be considered an 'active' region/metaspin, i.e. a region/metaspin that has received at least one lidar point, but has not yet received all expected lidar points.

Method 100 may comprise operation 108, of receiving a signal indicating a change in driving direction of the vehicle 152. The change may be from a first driving direction to an opposing second driving direction of a bi-directional vehicle 152. In the example illustrations 150-1, 162-1, the signal indicating a change in driving direction (the "flipping signal"), is represented by the time point tf, which may be the time at which the flipping signal is received, or a time at which the vehicle actually changed driving direction. In these examples, tf falls within the first time range of region T1. In the example 150-1, the flipping signal may indicate a change in direction from a 'north' direction up the page, to a 'south' direction down the page. If the 'south' end of the vehicle 152 is now the front of the vehicle 152, the temporal seam at point 158 is ahead of the vehicle 152 in the direction of travel. The distortions caused by the temporal seam may therefore reduce the reliability of any predictions or controls based in part on the received lidar data.

Method 100 may in some examples comprise operation 110. Operation 110 may comprise allocating, in response to receiving the flipping signal, an intermediate region of the memory for storing lidar data points associated with an intermediate time period. The intermediate region may be allocated after the active first region T1. By allocating the intermediate region after the active region T1 (or after all active regions, where more than one regions are active), lidar points that have already been received may not have to be reallocated. Reallocation may consume computational resources. Example 162-2 illustrates allocation of the buffer memory with an intermediate region Ti allocated. In this example, the intermediate period of intermediate region represents a half of a full detection cycle of the lidar sensor(s) 154. For example, the intermediate region may be approximately half the length of the first time region. For example, where the first region T1 has a duration of approximately 100 ms, corresponding to a full rotation of the lidar sensor 154, the intermediate region Ti may have a duration of approximately 50 ms. The intermediate region Ti may be considered a transitional metaspin.

Method 100 may comprise operation 112, of associating a second region of the memory with a second full rotational detection cycle. The second full rotational detection cycle may be associated with a seam at point 164, as discussed below. In some examples a second region of the memory may be allocated for storing lidar data points/returns associated with a second time period. The second time period may represent a full detection cycle of the lidar sensor that is after the half of the detection cycle of the intermediate region Ti. The second period may have the same duration as the first period of the first region T1. The second region may represent a full metaspin. A second region T2 within the buffer memory is illustrated in example 162-2.

Example 150-2 illustrates the effect of defining the intermediate region Ti, i.e. the transitional metaspin. The intermediate region Ti may be half a full metaspin duration. The end point of the intermediate region Ti may thus be approximately 180-degrees different to the start/end point 158 of a full metaspin, such as first region T1. In example 152-2, the end of the intermediate region Ti is illustrated by point 164. The second region T2, i.e. the next full metaspin, may start (approximately) at the end point of the intermediate region Ti, and thus point 164 may also represent the start and end points of the second region T2. Therefore the temporal seam of a full metaspin has moved from a first position at point 158 to an opposing second position at point 164 with respect to the vehicle. As the vehicle 152 is now travelling in the opposite direction to the initial direction, as indicated by the arrow in example 150-2, the temporal seam has been shifted to the new rear of the vehicle 152.

Method 100 may comprise operation 114, at which further lidar data comprising a second lidar point may be received. The second lidar point may be associated with a second timestamp. In the example 150-2, the second lidar point is represented by point 166, and is associated with a second timestamp t2.

Method 100 may comprise operation 116, at which the second lidar point 166 may be allocated to the first region T1, intermediate region Ti, or second region T2 of the memory based on the second timestamp. In the illustrated example 150-2, the second lidar point 166 may be associated with a time within the second time range, and thus may be allocated to the third period T2. Example 162-3 illustrates the second lidar point 166 allocated in the second region in the buffer. If instead the timestamp of the second lidar point 166 was in the intermediate region, the second lidar point 166 may be allocated to the intermediate region Ti (the transitional metaspin). If instead the timestamp of the second lidar point 166 was in the first time region, the second lidar point 166 may be allocated to the first region T1.

Method 100 may comprise operation 118, at which the autonomous vehicle may be controlled based at least in part on lidar points stored in the first region T1 and/or the second region T2 of the memory. For example, lidar points in the first region T1 may be output as a first metaspin, and lidar points in the second region T2 may be output as a second metaspin. The first and second metaspins may be provided to downstream components of the vehicle 152, such as a prediction and/or planning component configured to determine controls for controlling the vehicle 152. Thus in some examples the vehicle 152 may be controlled based on the full metaspins. In some examples, any lidar points allocated to the intermediate region Ti, the transitional metaspin, may be dropped, i.e. not used to control the vehicle 152. Lidar points allocated to the transitional metaspin may instead be deleted from the buffer memory without being output. Dropping lidar points associated with the transitional metaspin may mean that downstream components only receive full metaspins with a consistent size, rather than having to be able to process metaspins of varying sizes. This may allow for more efficient processing of metaspins by the downstream components. The dropped lidar points may represent a relatively small amount of lidar data, and so losing these data points may have only minimal impact on the control of the vehicle. In particular, in the case of a switch in driving direction of a bi-directional vehicle 152, the direction change may occur when the vehicle is stationary, or very moving very slowly. The environment around the vehicle 152 may therefore be relatively constant over the short period of the transitional metaspin (e.g. approximately 50 ms), and so there may be minimal useful data loss be dropping the transitional lidar points. In some examples, an intermediate region of the memory may not be used. Instead, any lidar returns associated with the intermediate time period between the first full detection cycle and the second full detection cycle may not be recorded.

It is to be noted that although the first, second and intermediate regions of the memory have been described and illustrated as separate regions, in some examples the same region of the memory may be re-used for to store lidar returns associated with different time periods. For example, both the first and third intermediate regions may actually represent the same physical region of the memory.

Figure 2:
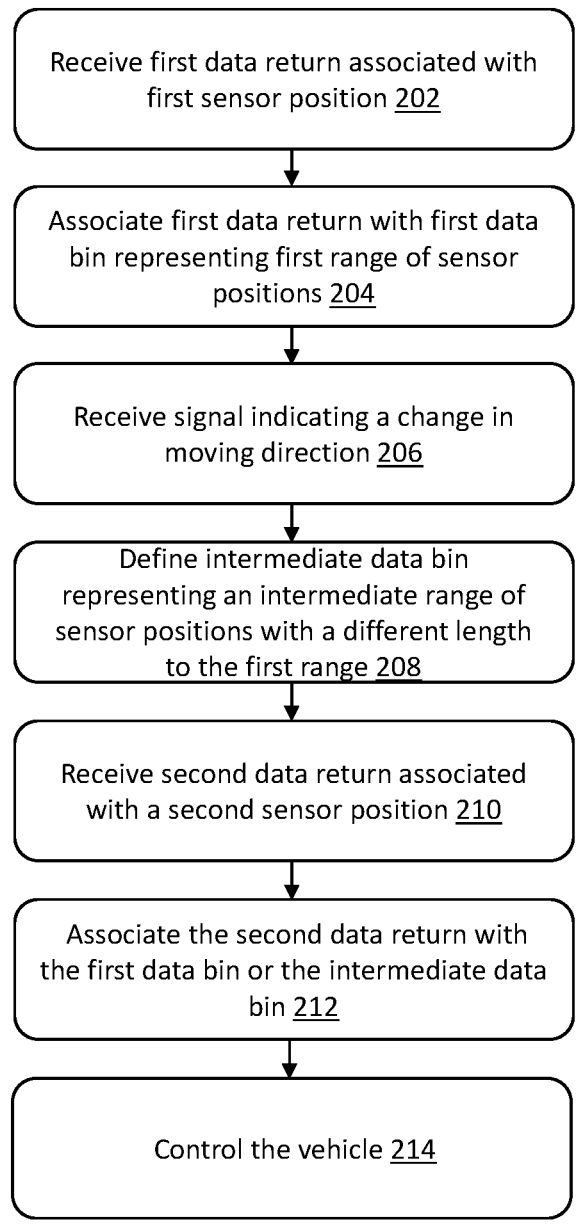
FIG. 2 is a flowchart illustrating a method according to techniques of the present disclosure.

FIG. 2 illustrates a method 200 according to techniques of the present disclosure. Method 200 may be performed by a system or component of a vehicle, such as an autonomous vehicle. In particular method 200 may be performed by a perception component of a vehicle, such as the perception component discussed below in relation to FIG. 3.

Method 200 may comprise operation 202, at which a first data point/return captured by a sensor of a vehicle may be received. The sensor may be, or may comprise one or more lidar sensors. The sensor may perform sweeping scans, which may be a scan ranging across multiple sensor positions. A sweeping scan may comprise a seam. For example a seam may be a seam or join between a start and end of the sweeping scan, as discussed above in relation the temporal scan. For example the sensor may comprise one or more mechanical/rotating lidar sensors. Alternatively or additionally, the sensor may comprise other sensors, such as a radar sensor or a camera. Where the sensor comprises multiple individual sensors, the individual sensors may be phase locked such that one complete scan of each individual sensor takes the same amount of time, or such that the sensors together provide continuous scan (e.g. where each sensor only covers a portion of the full field of view).

The first data point may be associated with a first sensor position. For example the first data point may comprise, or may be associated with, a first timestamp. The first timestamp may relate to the time at which the sensor received the measurement from which the first data point was derived, and thus the timestamp may relate to the sensor position when said measurement was received. The first data point may comprise, or may be associated with, an indication of an orientation of the sensor, such as an orientation (e.g. azimuthal angular) of the sensor when the measurement was received.

Method 200 may comprise operation 204, at which the first data point may be associated with a first data bin based on the first sensor position. The first data bin may represent a first sweeping scan of the sensor. The first sweeping scan may have a seam at a first position with respect to the vehicle. For example, the first data bin may represent a first range of sensor positions associated with a first sweeping scan of the sensor. For example, the first data bin may represent a first time range, or a first range of azimuthal angles of the sensor. A first data point may be assigned to the first data bin if a sensor position associated with the first data point falls within the first range of sensor positions of the first data bin.

The first data bin may represent a metaspin, as discussed above. The first data bin may be defined within a memory, such as a buffer memory. The memory may be memory of a system or component implementing the method 200, such as a sensor system or perception component of an autonomous vehicle. Thus some examples may comprise allocating a first region of a memory for storing data points assigned to the first data bin.

In some examples the first range of the first data bin may represent a complete scan of the sensor. For example the first range may represent a full 360-degree rotation of the sensor. In other examples the first range may comprise only a portion of a complete scan. The data bin may comprise a buffer period (or region), extending beyond the first range, to allow for hardware delays. The buffer period may have a length 10% or less, 7% or less, or 5% or less of the full length of the first range. For example, where the length of the first range is approximately 100 ms, a buffer period may have a length of approximately 5 ms. Where buffer periods are used, one data bin may overlap with a subsequent data bin, such that data points falling within the buffer period may be assigned to two adjacent data bins.

The first data bin and/or first sweeping scan may be defined such that the seam, e.g. the azimuthal position of the sensor (or range of azimuthal positions) associated with the start and end points of the first data bin, is located towards the rear of the vehicle with respect to a moving (or driving) direction of the vehicle. Thus an end point of the first range of sensor positions/position of the seam may represent an azimuthal position with respect to an initial moving direction of the vehicle in the range from 90° to 270°, or from 135° to 225°.

The method 200 may comprise operation 206, at which a signal may be received indicating a change in a moving direction of the vehicle. The change in moving direction may be from a forwards direction to a reverse direction. The change in moving direction may be a change from one driving direction to an opposing driving direction (i.e. changing the 'forwards' direction of the vehicle such as in a bi-directional vehicle). Although generally described herein as being a change in moving direction of 180-degrees, other examples may involve any other change of direction, such as a 90-degree change of direction. The signal indicating a change may be received by the system or component implementing method 200, and may be received by a memory of said system, and may be processed to interpret the signal only after a delay. The signal indicating a change may be a signal indicating a status of the vehicle, incorporating information about the moving direction of the vehicle. The signal may specify a change of direction, or the change of direction may be determined by comparing a current moving direction in the signal to a previous moving direction of the vehicle.

The signal indicating the change in moving direction may be associated with a time (referred to herein as a "flipping time"). The flipping time may represent the time the change in moving direction occurred, or the time the signal was received at the system/component implemented method 200. The flipping time may fall within the time range represented by the first range of sensor positions/associated with the first sweeping scan. In other words, the signal may be received whilst the sensor scan associated with the first data bin is in progress. In other examples, the flipping time may be earlier than the time range of the first data bin, for example falling to a time range associated with an earlier data bin/metaspin/sweeping scan.

The method 200 may optionally comprise operation 208, at which, in response to the signal indicating a change in the moving direction, an intermediate data bin may be defined. The intermediate data bin may represent an intermediate range of sensor positions. The intermediate range of sensor positions may be after the first range of sensor positions (e.g. following immediately after the first region). The intermediate bin may comprise a buffer region/period, extending beyond the intermediate range as discussed above for the first data bin. The intermediate range of sensor positions may have a different length to the first range of sensor positions. For example, the intermediate range may represent a larger or smaller range of times than the first range; or may represent a larger or smaller range of orientations/angular positions of the sensor than the first range. In some examples, the intermediate range may represent a half rotation of the sensor. In other examples the intermediate range may represent one and a half rotations of the sensor. Any other length of the intermediate range may be used to rotate the temporal seam to the desired location. Some examples may comprise allocating a intermediate region of a memory, such as a buffer memory, for storing data points of the intermediate data bin.

The intermediate region may represent a transitional metaspin. By defining a region with different length to normal metaspins, the seam of the metaspin/sweeping scan may be moved from a first position with respect to the vehicle to a second position with respect to the vehicle. For example the seam may be moved from the previous rear of the vehicle to the previous front of the vehicle, such that the temporal seam is moved to behind the vehicle with respect to the new direction of movement. For example, an end point of the intermediate range of sensor positions may represent an azimuthal position with respect to the initial moving direction of the vehicle in the range from −90° to 90°, or in the range from −45° to 45°. An end point of the intermediate range of sensor positions may represent an azimuthal position with respect to the new moving direction of the vehicle in the range from 90° to 270°, or from 135° to 225°.

The intermediate region may be defined to have a range of sensor positions after all active data bins. An active data bin may be one which for which at least one data point has been received. Thus if the first data bin represents the latest active data bin, the intermediate region may be defined immediately after the first region. In particular, if the flipping signal is associated with a time earlier than the first range of the first data bin, but the first data bin has received at least one data point by the time the flipping signal is processed, the intermediate region may only be defined after the full first range of the first data bin. In other words, the there is a delay between the change in direction of the vehicle and the transitional intermediate region. As discussed above, by defining the intermediate data bin after the already defined and active first data bin, techniques of the present disclosure may minimize disruption to downstream processes and avoid the computational burden that would be required if the data bins were redefined immediately upon receiving the signal indicating the change in direction.

Some examples may comprise defining a second data bin. The second data bin may represent a second sweeping scan of the sensor. The second sweeping scan may have a seam at the second position with respect to the vehicle. The second data bin may represent a second range of sensor positions. The second range of sensor positions may be follow the intermediate range, for example immediately after (or overlapping with, to provide a buffer region), the intermediate range. Thus, for example, the intermediate range may separate the end of a first sweeping scan from the start of a second sweeping scan, changing the position of the respective seams of those scans. A length of the second range may be equal or substantially equal to a width of the first range. For example, second range may represent a complete scan of the sensor, such as a full 360-degree rotation of the sensor. Thus the third data bin may represent a 'normal' metaspin, restoring the length of the metaspins after the transitional metaspin. Subsequently defined data bins may also have the same or similar length to the first data bin.

In some examples, the first and second data bins may be defined, but the intermediate data bin may be omitted. For example, the second data bin may be defined to represent a range of sensor positions that follows an intermediate range of sensor positions after the first range of sensor positions. Received lidar returns may be assigned to the first bin or second bin. Any lidar returns having a sensor position associated with the intermediate range may not be recorded.

The method 200 may comprise operation 210, at which a intermediate data point/return associated with a intermediate sensor position may be received. As with the first data point, the intermediate data point may be associated with or comprise a timestamp or orientation associated with the intermediate sensor position.

The method 200 may comprise operation 212, at which the intermediate data point may be associated with the first data bin or the intermediate data bin based on the second sensor position (or associated with the first, intermediate, or second data bin, where a second data bin has been defined). For example, the second data point may be stored in a memory region allocated to the data bin having a sensor position range corresponding to the intermediate sensor position. As will be appreciated, any further number of data points may be received and may be allocated to data bins according to their respective sensor positions.

The method 200 may comprise operation 214, at which the vehicle may be controlled based at least in part on data points allocated to the first data bin, and optionally the second data bin. Control may be based at least in part on any further 'normal' data bins. For example, data points allocated to the first data bin may be output as a first metaspin. The first metaspin may be provided to components of the vehicle configured to determine vehicle controls, such as a prediction and/or planning component of the vehicle.

In some examples, data points allocated to the intermediate data bin may be discarded. For example, such data points may not be output and provided to downstream systems, and may be deleted from a memory such as a buffer memory of the system/component performing method 200. By discarding the data points in the transitional metaspin, the downstream components only receive metaspins with a constant size. This may make processing of the metaspins by the downstream components more efficient. In other examples, data points in the intermediate data bin may be output and provided to the downstream components. For example, the transitional metaspin itself may be output. Alternatively data points of the intermediate data bins may be combined with those of the first or third data bins, to output a combined metaspin that is larger than a normal metaspin.

In some examples of method 200, a further signal indicating a change of moving direction of the vehicle may be received. If the further signal is received (or processed) after the second data bin becomes active, the method 200 may return to operation 202 and proceed as described above. In some examples however, such as where no data points have yet been allocated to the second data bin, a further data bin may be defined after the intermediate data bin. The second data bin may then be disregarded. In some examples the further signal may indicate that the vehicle has returned to its original moving direction. In such examples the further data bin may have a further sensor range sized such that the combined length of the intermediate range and the further range is approximately equal to the length of the first range of the first data bin. In other words, the combined length may be approximately equal to that of a 'normal' metaspin. In some examples, both the intermediate data bin and the further data bin may represent half rotations of the sensor (i.e. a 180-degree rotation), such the combined range represents a full rotation of the sensor. By such means, the seam may be restored to the first position relative to the vehicle, i.e. where it would have been if the first signal indicating change of direction had never been received. In some examples, the intermediate data bin and further data bin may be combined to form a combined data bin. Data points allocated to the combined bin may be output as a 'normal' metaspin. Such techniques may provide all data points to the downstream systems, instead of discarding data points as part of the flipping process.

Figure 3:
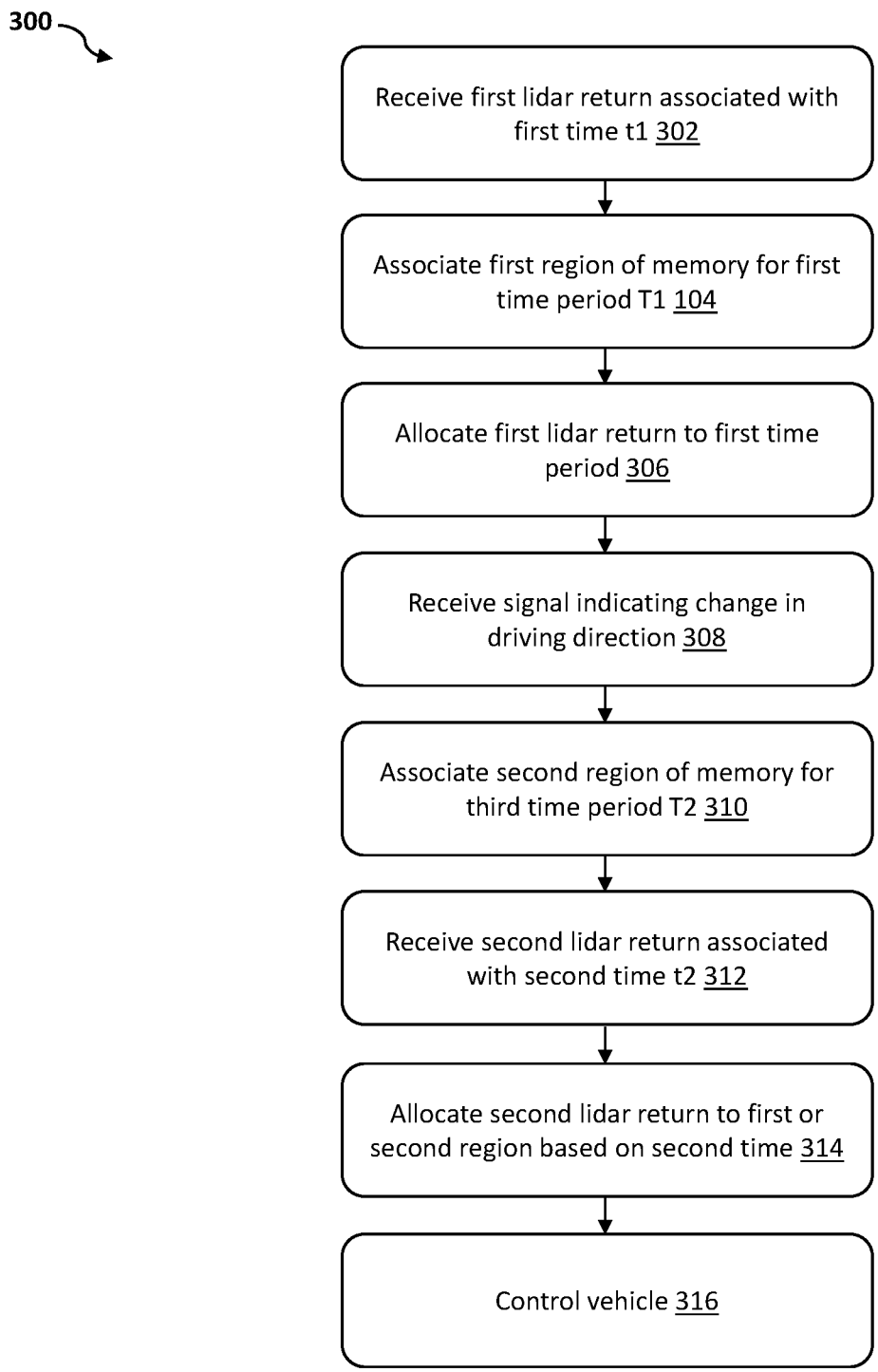
FIG. 3 is a flowchart illustrating a method according to techniques of the present disclosure.

FIG. 3 illustrates an example method 300 according to aspects of this disclosure.

Method 300 may comprise operation 302, at which lidar data of an environment captured by a mechanical lidar sensor of a bi-directional autonomous vehicle may be received. The lidar data may comprise a first lidar return associated with a first timestamp. Operation 302 may be the same or similar to operation 102 of method 100.

Method 300 may comprise operation 304, at which a first region of a memory may be associated with a first full rotational detection cycle of the mechanical lidar sensor. The first full rotational detection cycle may comprise a first seam between a start and an end of the rotational detection cycle. The first seam may be associated with a first position with respect to the vehicle. Operation 304 may be the same as or similar to operation 104 of method 100.

Method 300 may comprise operation 306, at which, based on the first timestamp, the first lidar return may be allocated to the first region of the memory. Operation 306 may be the same or similar to operation 106 of method 100.

Method 300 may comprise operation 308, at which a signal may be received indicating a change in driving direction of the autonomous vehicle from the first driving direction to the second driving direction. Operation 308 may be the same or similar to operation 108 of method 100.

Method 300 may comprise operation 310, at which, in response to receiving the signal indicating a change in driving direction, a second region of the memory may be associated with a second full rotational detection cycle of the mechanical lidar sensor. The second full rotational detection cycle may start a half of the rotational detection cycle after the end of the first full detection cycle. The second full rotational detection cycle may comprise a second seam associated with a second position with respect to the vehicle, the second position opposing the first position. Operation 310 may be the same or similar to operation 112 of method 100.

Method 300 may comprise operation 312, at which further lidar data may be received comprising a second lidar return associated with a second timestamp. Operation 312 may be the same or similar to operation 114 of method 100.

Method 300 may comprise operation 314, at which the second lidar return may be allocated to the first region, or the second region of the memory based on the second timestamp. Operation 314 may be the same or similar to operation 116 of method 100.

Method 300 may comprise operation 314, at which the second lidar return may be allocated to the first region, or the second region of the memory based on the second timestamp. Operation 314 may be the same or similar to operation 116 of method 100.

Method 300 may comprise operation 316, at which the autonomous vehicle may be controlled based at least in part on lidar returns stored in the first region and the second region of the memory. Operation 316 may be the same or similar to operation 118 of method 100.

Figure 4:
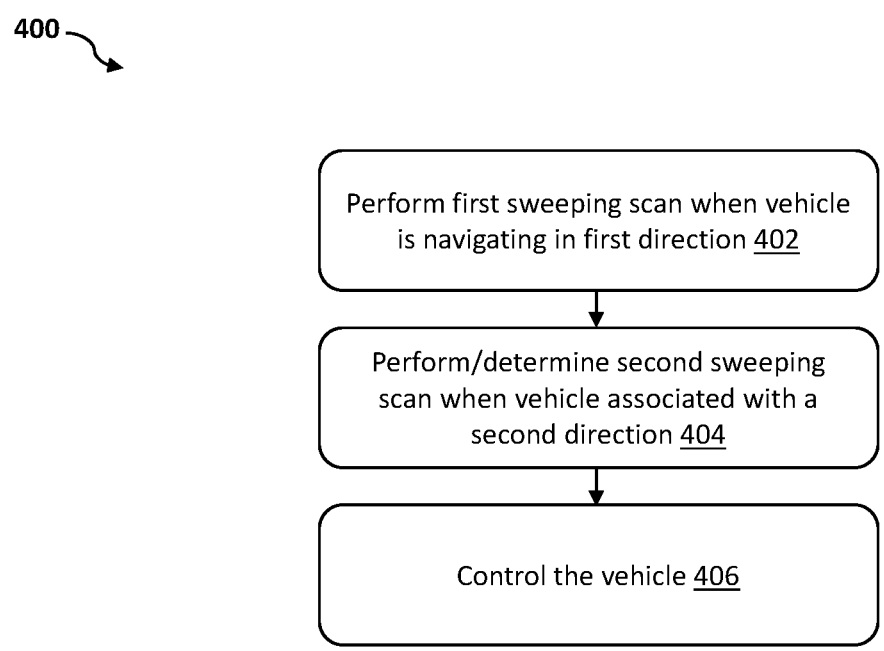
FIG. 4 is a flowchart illustrating a method according to techniques of the present disclosure.

FIG. 4 illustrates an example method 400 according to examples to the disclosure.

Method 400 may comprise operation 402. At operation 402, a first sweeping scan may be performed using a sensor of a vehicle. The first sweeping scan may be performed when the vehicle is navigating in a first direction. The first sweeping scan may comprise a seam at a first location relative to the vehicle. The first sweeping scan may for example represent a first metaspin, as discussed above. As discussed in relation to method 200, lidar returns may be associated with a first data bin representing the first sweeping scan.

Method 400 may comprise operation 404. At operation 404, a second sweeping scan may be determined. In some examples, the second sweeping scan may be performed. The second sweeping scan may be associated with a second direction, different to the first direction. For example, the second sweeping scan may be determined/performed when the vehicle is navigating in a second direction. The second sweeping scan may comprise a seam at a second location relative to the vehicle that is different to the first location. The second location may be a location opposing the first location with respect to the vehicle. As discussed in relation to method 200, lidar returns may be associated with a second data bin representing the second sweeping scan.

Method 400 may comprise operation 406. At operation 406, the vehicle may be controlled based at least in part on the first sweeping scan and/or the second sweeping scan.

In some examples, an intermediate sweeping scan may be performed between the first sweeping scan and the second sweeping scan. The intermediate sweeping scan may represent a full sweeping scan, similar to the first sweeping scan. In such a case, the intermediate sweeping scan may have a seam at the first position even though the vehicle has changed direction. For example, the intermediate sweeping scan may be an active scan, i.e. a scan that has already started to record points by the time the change in driving direction is processed by the sensor system/perception component. The intermediate sweeping scan may alternatively or additionally comprise a partial sweep, corresponding to the intermediate range of sensor positions discussed above in relation to method 200.

In some examples, the vehicle may change direction again before the second sweeping scan has been performed (e.g. before data has been received from the sensor for the second sweeping scan). In such examples, a further sweeping scan may be defined comprising a seam at the original first location. The second sweeping scan may be replaced with the further sweeping scan. Thus the second sweeping scan may not be performed, and instead the further sweeping scan may be performed.

Figure 5:
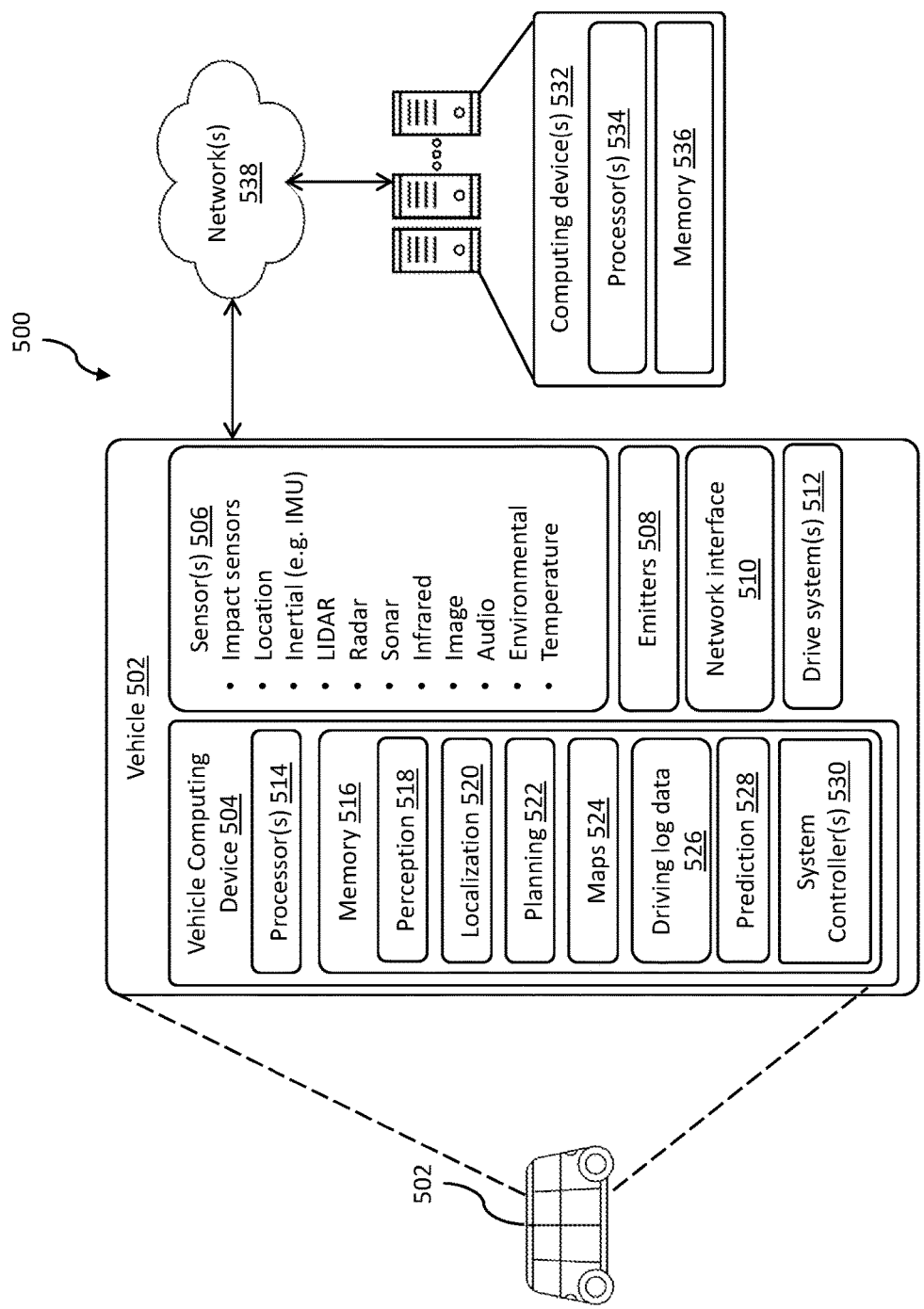
FIG. 5 is a block diagram of an example system for implementing the techniques described herein.

FIG. 5 illustrates a block diagram of an example system 500 that implements the techniques discussed herein. In some instances, the example system 500 may include a vehicle 502. In some instances, the vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 502 may be a fully or partially autonomous vehicle having any other level or classification. Moreover, in some instances, the techniques described herein may be usable by non-autonomous vehicles as well.

The vehicle 502 may include a vehicle computing device(s) 504, sensor(s) 506, emitter(s) 508, network interface(s) 510, and/or drive system(s) 512. Sensor(s) 506 may represent sensor(s) 112. The system 500 may additionally or alternatively comprise computing device(s) 532.

In some instances, the sensor(s) 506 may represent sensor(s) 112 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 506 may include multiple instances of each of these or other types of sensors. For instance, the radar sensors may include individual radar sensors located at the corners, front, back, sides, and/or top of the vehicle 502. As another example, the cameras may include multiple cameras disposed at various locations about the exterior and/or interior of the vehicle 502. The sensor(s) 506 may provide input to the vehicle computing device(s) 504 and/or to computing device(s) 532.

The vehicle 502 may also include emitter(s) 508 for emitting light and/or sound, as described above. The emitter(s) 508 may include interior audio and visual emitter(s) to communicate with passengers of the vehicle 502. Interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 508 may also include exterior emitter(s). Exterior emitter(s) may include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 502 may also include network interface(s) 510 that enable communication between the vehicle 502 and one or more other local or remote computing device(s). The network interface(s) 510 may facilitate communication with other local computing device(s) on the vehicle 502 and/or the drive component(s) 512. The network interface(s) 510 may additionally or alternatively allow the vehicle to communicate with other nearby computing device(s) (e.g., other nearby vehicles, traffic signals, etc.). The network interface(s) 510 may additionally or alternatively enable the vehicle 502 to communicate with computing device(s) 532 over a network 538. In some examples, computing device(s) 532 may comprise one or more nodes of a distributed computing system (e.g., a cloud computing architecture).

The vehicle 502 may include one or more drive components 512. In some instances, the vehicle 502 may have a single drive component 512. In some instances, the drive component(s) 512 may include one or more sensors to detect conditions of the drive component(s) 512 and/or the surroundings of the vehicle 502. By way of example and not limitation, the sensor(s) of the drive component(s) 512 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 512. In some cases, the sensor(s) on the drive component(s) 512 may overlap or supplement corresponding systems of the vehicle 502 (e.g., sensor(s) 506).

The drive component(s) 512 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 512 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 512. Furthermore, the drive component(s) 512 may also include one or more communication connection(s) that enable communication by the respective drive component with one or more other local or remote computing device(s).

The vehicle computing device(s) 504 may include processor(s) 514 and memory 516 communicatively coupled with the one or more processors 514. Computing device(s) 532 may also include processor(s) 534, and/or memory 536. The processor(s) 514 and/or 534 may be any suitable processor capable of executing instructions to process data and perform operations as described herein. By way of example and not limitation, the processor(s) 514 and/or 534 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 516 and/or 536 may be examples of non-transitory computer-readable media. The memory 516 and/or 536 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 516 and/or memory 536 may store a perception component 518, localization component 520, planning component 522, map(s) 524, driving log data 526, prediction component 528, and/or system controller(s) 530—zero or more portions of any of which may be hardware, such as GPU(s), CPU(s), and/or other processing units.

The perception component 518 may detect object(s) in in an environment surrounding the vehicle 502 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 518 is referred to as perception data. The perception component 518 may be configured to associate a bounding region (or other indication) with an identified object. The perception component 518 may be configured to associate a confidence score associated with a classification of the identified object with an identified object. In some examples, objects, when rendered via a display, can be colored based on their perceived class. The object classifications determined by the perception component 518 may distinguish between different object types such as, for example, a passenger vehicle, a pedestrian, a bicyclist, motorist, a delivery truck, a semi-truck, traffic signage, and/or the like.

In at least one example, the localization component 520 may include hardware and/or software to receive data from the sensor(s) 506 to determine a position, velocity, and/or orientation of the vehicle 502 (e.g., one or more of an x-, y-, z-position, roll, pitch, or yaw). For example, the localization component 520 may include and/or request/receive map(s) 524 of an environment and can continuously determine a location, velocity, and/or orientation of the autonomous vehicle 502 within the map(s) 524. In some instances, the localization component 520 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 520 may provide data to various components of the vehicle 502 to determine an initial position of an autonomous vehicle for generating a trajectory and/or for generating map data, as discussed herein. In some examples, localization component 520 may provide, to the perception component 518, a location and/or orientation of the vehicle 502 relative to the environment and/or sensor data associated therewith.

The planning component 522 may receive a location and/or orientation of the vehicle 502 from the localization component 520 and/or perception data from the perception component 518 and may determine instructions for controlling operation of the vehicle 502 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 530 and/or drive component(s) 512 may parse/cause to be carried out, second instructions for the emitter(s) 508 may be formatted according to a second format associated therewith).

The driving log data 526 may comprise sensor data, perception data, and/or scenario labels collected/determined by the vehicle 502 (e.g., by the perception component 518), as well as any other message generated and or sent by the vehicle 502 during operation including, but not limited to, control messages, error messages, etc. In some examples, the vehicle 502 may transmit the driving log data 526 to the computing device(s) 532. The computing device(s) 532 may identify one or more scenarios based at least in part on the log data, which may also comprise defining a scenario, wherein the scenarios are used to generate a playback simulation. For example, the computing device(s) 532 may determine an environmental layout, a number, type, and a configuration of object(s) in the environment and/or associate this definition with one or more portions of log data associated with that scenario. In some examples, the driving log data 526 may comprise (historical) perception data that was generated on the vehicle 502 during operation of the vehicle.

The prediction component 528 may generate one or more probability maps representing prediction probabilities of possible locations of one or more objects in an environment. For example, the prediction component 528 may generate one or more probability maps for vehicles, pedestrians, animals, and the like within a threshold distance from the vehicle 502. In some examples, the prediction component 528 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment. In some examples, the planner component 522 may be communicatively coupled to the prediction component 528 to generate predicted trajectories of objects in an environment. For example, the prediction component 528 may generate one or more predicted trajectories for objects within a threshold distance from the vehicle 502. In some examples, the prediction component 528 may measure a trace of an object and generate a trajectory for the object based on observed and predicted behavior. Although prediction component 528 is shown on a vehicle 502 in this example, the prediction component 528 may also be provided elsewhere, such as in a remote computing device as shown in FIG. 5. In some embodiments, a prediction component may be provided at both a vehicle and a remote computing device. These components may be configured to operate according to the same or a similar algorithm.

The memory 516 and/or 536 may additionally or alternatively store a mapping system, a planning system, a ride management system, etc. Although perception component 518 and/or planning component 522 are illustrated as being stored in memory 516, perception component 518 and/or planning component 522 may include processor-executable instructions, machine-learned model(s) (e.g., a neural network), and/or hardware.

As described herein, the localization component 520, the perception component 518, the planning component 522, the prediction component 528, and/or other components of the system 500 may comprise one or more ML models. For example, the localization component 520, the perception component 518, the planning component 522, and/or the planning component 528 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 520 may additionally or alternatively store one or more system controller(s) 530, which may be configured to control steering, propulsion, braking, safety, emitters, communication, and other systems of the vehicle 502. These system controller(s) 530 may communicate with and/or control corresponding systems of the drive component(s) 512 and/or other components of the vehicle 502.

It should be noted that while FIG. 5 is illustrated as a distributed system, in alternative examples, components of the vehicle 502 may be associated with the computing device(s) 532 and/or components of the computing device(s) 532 may be associated with the vehicle 502. That is, the vehicle 502 may perform one or more of the functions associated with the computing device(s) 532, and vice versa.

Example Clauses

A: A system comprising: one or more processors; and one or more non-transitory computer-readable media storing instructions that, when executed, cause the system to perform operations comprising: receiving lidar data of an environment captured by a mechanical lidar sensor of a bi-directional autonomous vehicle, the lidar data comprising a first lidar return associated with a first timestamp, the bi-directional autonomous vehicle configured to operate in a first driving direction or an opposing second driving direction; associating a first region of a memory with a first full rotational detection cycle of the mechanical lidar sensor, the first full rotational detection cycle comprising a first seam between a start and an end of the rotational detection cycle, the first seam associated with a first position with respect to the vehicle; allocating, based on the first timestamp, the first lidar return to the first region of the memory; receiving a signal indicating a change in driving direction of the autonomous vehicle from the first driving direction to the second driving direction; associating, in response to receiving the signal indicating a change in driving direction, a second region of the memory with a second full rotational detection cycle of the mechanical lidar sensor that starts a half of the rotational detection cycle after the end of the first full detection cycle, such that the second full rotational detection cycle comprises a second seam associated with a second position with respect to the vehicle, the second position opposing the first position; receiving further lidar data comprising a second lidar return associated with a second timestamp; allocating the second lidar return to the first region, or the second region of the memory based on the second timestamp; and controlling the autonomous vehicle based at least in part on lidar returns stored in the first region and the second region of the memory.

B: The system according to clause A, wherein the signal indicating the change in driving direction is associated with a full rotational detection cycle preceding the first full rotational detection cycle.

C: The system according to clause A or clause B, the operations further comprising: associating, in response to receiving the signal indicating a change in driving direction, a third region of the memory with the half of a rotational detection cycle between the first full rotational detection cycle and the second full rotational detection cycle of the mechanical lidar; and allocating a third lidar return to the third region of the memory D: The system according to any of clauses A to C, wherein the first region of the memory is further associated with a buffer period representing a portion of the rotational detection cycle of the mechanical lidar continuous with the end of the first full rotational detection cycle.

E: A method comprising: performing a first sweeping scan using a sensor of a vehicle when the vehicle is navigating in a first direction, the first sweeping scan comprising a seam at a first location relative to the vehicle; determining a second sweeping scan using the sensor associated with the vehicle navigating in a second direction different form the first direction, the second sweeping scan comprising a seam at a second location relative to the vehicle different from the first location; and controlling the vehicle based at least in part on the first sweeping scan or the second sweeping scan.

F: The method according to clause E, comprising: determining a third sweeping scan when the vehicle returns to navigating in the first direction, the third sweeping scan comprising the seam at the first location; and controlling the vehicle based at least in part on the third sweeping scan.

G: The method according to clause E or F, comprising performing an intermediate sweeping scan between the first sweeping scan and the second sweeping scan.

H: The method according to any of clauses E to G, comprising controlling the vehicle based at least in part on the second sweeping scan when the vehicle changes direction during the first sweeping scan.

I: The method according to any of clauses E to H, wherein the first sweeping scan represents at least a full rotation of the sensor.

J: The method according to any of clauses E to I, wherein the second location is opposing the first location with respect to the vehicle.

K: The method according to any of clauses E to J, wherein the sensor comprises one or more lidar sensors.

L: The method according to any of clauses E to K, wherein the first location relative to the vehicle has an azimuthal position with respect to the first direction in the range from 90° to 270°.

M: The method according to any of clauses E to L, wherein the second location relative to the vehicle has an azimuthal position with respect to the first direction in the range from −90° to 90°.

N: The method according to any of clauses E to M, wherein the vehicle is a bi-directional vehicle, and wherein the method comprises changing a driving direction mode of the bi-directional vehicle to change from navigating in the first direction to navigating in the second direction.

O: One or more non-transitory computer-readable media storing instructions executable by one or more processors, wherein the instructions, when executed, cause the one or more processors to perform operations comprising: performing a first sweeping scan using a sensor of a vehicle when the vehicle is navigating in a first direction, the first sweeping scan comprising a seam at a first location relative to the vehicle; determining a second sweeping scan using the sensor associated with the vehicle navigating in a second direction different form the first direction, the second sweeping scan comprising a seam at a second location relative to the vehicle different from the first location; and controlling the vehicle based at least in part on the first sweeping scan or the second sweeping scan.

P: The one or more non-transitory computer-readable media of clause O, the operations comprising: receiving a first sensor return captured by a sensor of a vehicle, the first sensor return associated with a first sensor position associating the first sensor return with a first data bin based on the first sensor position, the first data bin representing a first range of sensor positions associated with the first sweeping scan; receiving a signal indicating a change of direction of the vehicle; in response to the signal indicating a change in the moving direction, defining a second data bin representing a second range of sensor positions associated with the second sweeping scan, the second range of sensor positions following an intermediate range of sensor positions after the first range of sensor positions.

Q: The one or more non-transitory computer-readable media according to clause P, wherein the signal indicating a change of direction is associated with the first sweeping scan, and wherein the intermediate range of sensor positions follows after a third data bin with which a sensor return has been associated, the third data bin representing a third sweeping scan of the sensor after the first sweeping scan.

R: The one or more non-transitory computer-readable media according to clause P or clause Q, wherein a width of the second range is equal or substantially equal to a width of the first range.

S: The one or more non-transitory computer-readable media according to any of clauses P to R, wherein the first range of sensor positions comprises a first range of orientations of the sensor, or a first time period.

T: The one or more non-transitory computer-readable media according to any of clauses O to S, wherein the vehicle is configured to operate in a first driving direction or an opposing second driving direction.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
    performing a first sweeping scan using a sensor of a vehicle when the vehicle is navigating in a first direction, the first sweeping scan comprising a seam at a first location relative to the vehicle;
    determining a second sweeping scan using the sensor associated with the vehicle navigating in a second direction different from the first direction, the second sweeping scan comprising a seam at a second location relative to the vehicle different from the first location; and
    controlling the vehicle based at least in part on the first sweeping scan or the second sweeping scan.

2. The method of claim 1, comprising:
    determining a third sweeping scan when the vehicle returns to navigating in the first direction, the third sweeping scan comprising the seam at the first location; and controlling the vehicle based at least in part on the third sweeping scan.

3. The method of claim 1, comprising: performing an intermediate sweeping scan between the first sweeping scan and the second sweeping scan.

4. The method of claim 1, further comprising:
    controlling the vehicle based at least in part on the second sweeping scan when the vehicle changes direction during the first sweeping scan.

5. The method of claim 1, wherein the first sweeping scan represents at least a full rotation of the sensor.

6. The method of claim 1, wherein the second location is opposing the first location with respect to the vehicle.

7. The method of claim 1, wherein the sensor comprises one or more lidar sensors.

8. The method of claim 1, wherein the first location relative to the vehicle has an azimuthal position with respect to the first direction in a range from 90° to 270°.

9. The method of claim 1, wherein the second location relative to the vehicle has an azimuthal position with respect to the first direction in a range from −90° to 90°.

10. The method of claim 1, wherein the vehicle is a bi-directional vehicle, and wherein the method comprises changing a driving direction mode of the bi-directional vehicle to change from navigating in the first direction to navigating in the second direction.

11. A non-transitory computer-readable medium storing instructions executable by one or more processors, wherein the instructions, when executed, cause the one or more processors to perform operations comprising:
    performing a first sweeping scan using a sensor of a vehicle when the vehicle is navigating in a first direction, the first sweeping scan comprising a seam at a first location relative to the vehicle;
    determining a second sweeping scan using the sensor associated with the vehicle navigating in a second direction different from the first direction, the second sweeping scan comprising a seam at a second location relative to the vehicle different from the first location; and
    controlling the vehicle based at least in part on the first sweeping scan or the second sweeping scan.

12. The non-transitory computer-readable media of claim 11, the operations comprising:
    receiving a first sensor return captured by a sensor of a vehicle, the first sensor return associated with a first sensor position;
    associating the first sensor return with a first data bin based on the first sensor position, the first data bin representing a first range of sensor positions associated with the first sweeping scan;
    receiving a signal indicating a change of direction of the vehicle;
    in response to the signal indicating a change in the moving direction, defining a second data bin representing a second range of sensor positions associated with the second sweeping scan, the second range of sensor positions following an intermediate range of sensor positions after the first range of sensor positions.

13. The non-transitory computer-readable media of claim 12, wherein the signal indicating a change of direction is associated with the first sweeping scan, and wherein the intermediate range of sensor positions follows after a third data bin with which a sensor return has been associated, the third data bin representing a third sweeping scan of the sensor after the first sweeping scan.

14. The non-transitory computer-readable media of claim 12, wherein a width of the second range is equal or substantially equal to a width of the first range.

15. The non-transitory computer-readable media of claim 12, wherein the first range of sensor positions comprises a first range of orientations of the sensor, or a first time period.

16. The non-transitory computer-readable media of claim 11, wherein the vehicle is configured to operate in a first driving direction or an opposing second driving direction.

* * * * *